United States Patent
Rhee et al.

(10) Patent No.: US 7,801,103 B2
(45) Date of Patent: Sep. 21, 2010

(54) APPARATUS AND METHOD FOR PROVIDING BROADCAST PARAMETER MESSAGE IN A MOBILE COMMUNICATION SYSTEM

(75) Inventors: Jong-Hun Rhee, Suwon-si (KR); Min-Goo Kim, Yongin-si (KR); Jong-Han Lim, Seongnam-si (KR); Hi-Chan Moon, Suwon-si (KR); Yong-Sun Hwang, Seoul (KR); Jae-Hyun Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1267 days.

(21) Appl. No.: 11/346,186

(22) Filed: Feb. 3, 2006

(65) Prior Publication Data

US 2006/0176871 A1 Aug. 10, 2006

(30) Foreign Application Priority Data

Feb. 4, 2005 (KR) ...................... 10-2005-0010326

(51) Int. Cl.
*H04J 3/00* (2006.01)
(52) U.S. Cl. .................................... 370/345; 455/154.1
(58) Field of Classification Search .................. 370/345, 370/347
See application file for complete search history.

(56) References Cited

U.S. PATENT DOCUMENTS

2003/0152107 A1* 8/2003 Pekonen ..................... 370/473
2004/0228360 A1* 11/2004 Bae et al. .................... 370/432
2005/0208959 A1 9/2005 Chen et al.
2005/0243775 A1 11/2005 Rhee et al.
2006/0099979 A1* 5/2006 Collins et al. ............... 455/466

FOREIGN PATENT DOCUMENTS

KR  10-2006-0044446 A  5/2006
WO  WO 2005/009070 A1  1/2005

OTHER PUBLICATIONS

Tao Chen, "Outer Coding in CDMA2000 Revision D", Jan. 12, 2004, pp. 1-5, Qualcomm Incorporated, Portland, Oregon, U.S.A.

* cited by examiner

*Primary Examiner*—Rafael Pérez-Gutiérrez
*Assistant Examiner*—Marcos Batista
(74) *Attorney, Agent, or Firm*—Roylance, Abrams, Berdo & Goodman, LLP

(57) ABSTRACT

A method and apparatus provide a broadcast parameter message in a mobile communication system providing a broadcast service. If the provided broadcast service is time domain multiplex (TDM)-multiplexed, a message generator generates the broadcast parameter message by setting a field indicating the TDM multiplexing, setting a field indicating a position of the broadcast service in each sub-buffer, setting a field indicating whether one sub-buffer includes one service and a field indicating validity of the field, and setting a field exclusively indicating actual broadcast service data stored in one sub-buffer. A transmitter modulates the broadcast parameter message and provides the modulated broadcast parameter message to a terminal that receives the broadcast service.

9 Claims, 14 Drawing Sheets

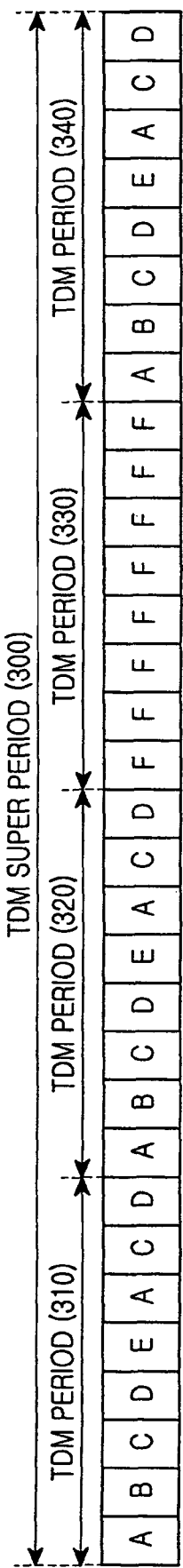
FIG.3
(CONVENTIONAL)

| SUB-BUFFER 0 (410) | SUB-BUFFER 1 (420) | SUB-BUFFER 2 (430) | SUB-BUFFER 3 (440) |
|---|---|---|---|
| A | B | C | D |
| E | A | C | D |
| A | B | C | D |
| E | A | C | D |
| F | F | F | F |
| F | F | F | F |
| A | B | C | D |
| E | A | C | D |
| A | B | C | D |
| E | A | C | D |
| A | B | C | D |
| E | A | C | D |
| F | F | F | F |
| F | F | F | F |
| A | B | C | D |
| E | A | C | D |

FIG.4

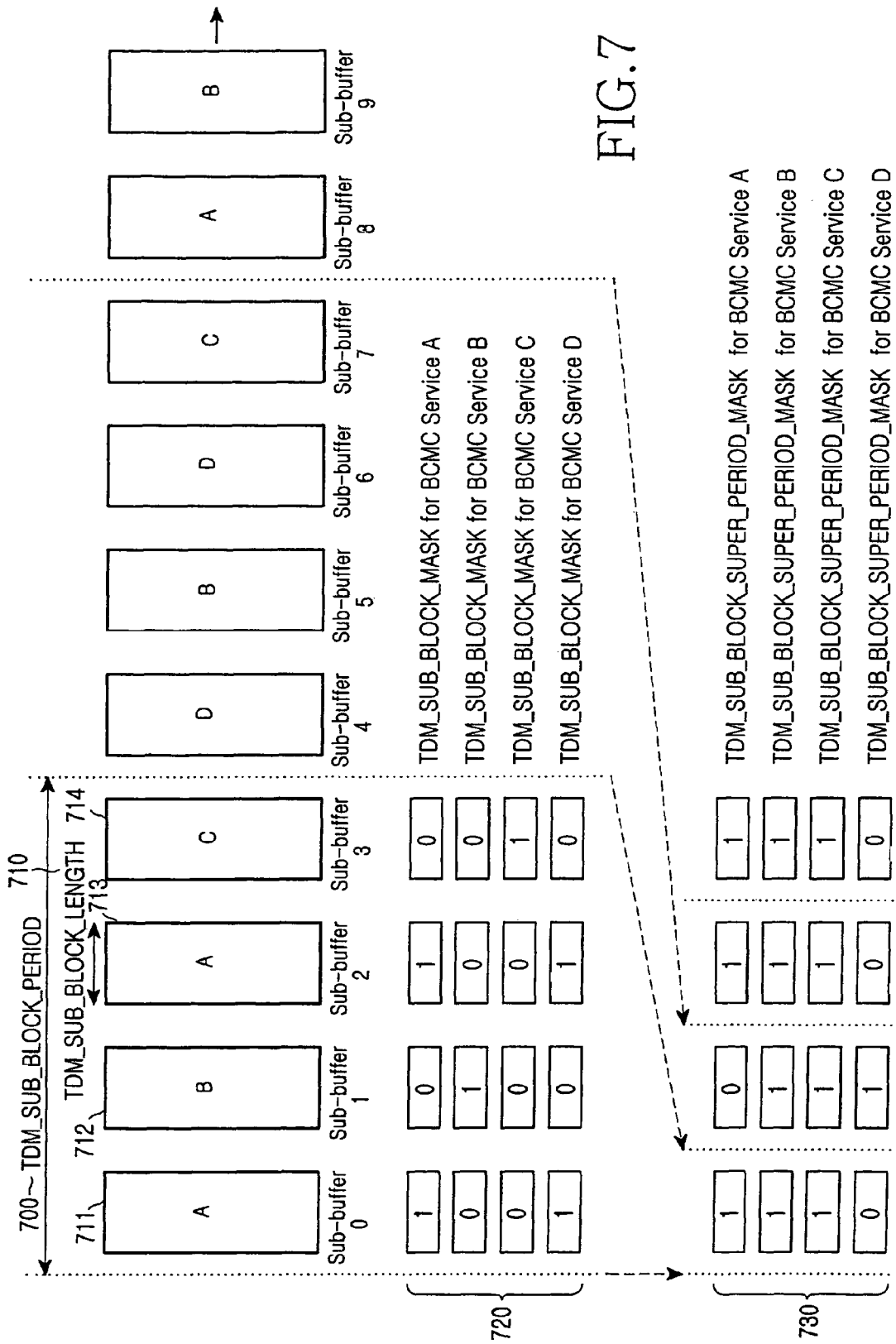

TDM_INNER_SUB_BLOCK_MASK for flow A, B, C, D, E, and (810)

| sub_buffer (800) | A | B | C | D | E | F | Inner_index |
|---|---|---|---|---|---|---|---|
| A | 1 | 0 | 0 | 0 | 0 | 0 | 0 |
| B | 0 | 1 | 0 | 0 | 0 | 0 | 1 |
| C | 0 | 0 | 1 | 0 | 0 | 0 | 2 |
| D | 0 | 0 | 0 | 1 | 0 | 0 | 3 |
| E | 0 | 0 | 0 | 0 | 1 | 0 | |
| A | 1 | 0 | 0 | 0 | 0 | 0 | |
| C | 0 | 0 | 1 | 0 | 0 | 0 | ⋮ |
| A | 1 | 0 | 0 | 0 | 0 | 0 | |
| F | 0 | 0 | 0 | 0 | 0 | 1 | |
| A | 1 | 0 | 0 | 0 | 0 | 0 | |
| B | 0 | 1 | 0 | 0 | 0 | 0 | |
| F | 0 | 0 | 0 | 0 | 0 | 1 | k-1 |
| Parity | 811 | 812 | 813 | 814 | 815 | 816 | |
| Parity | | | | | | | |
| Parity | | | | | | | |
| Parity | | | | | | | | k (801) spans the data portion; N-k (802) spans the Parity portion.

FIG.8

APPARATUS AND METHOD FOR PROVIDING BROADCAST PARAMETER MESSAGE IN A MOBILE COMMUNICATION SYSTEM

CROSS-REFERENCE TO RELATED APPLICATIONS

This application claims the benefit under 35 U.S.C. §119(a) of a Korean Patent Application Serial No. 2005-10326 filed in the Korean Intellectual Property Office on Feb. 4, 2005, the entire contents of which is hereby incorporated by reference.

BACKGROUND OF THE INVENTION

1. Field of the Invention

The present invention relates generally to an apparatus and method for receiving broadcast service in a mobile communication system. In particular, the present invention relates to an apparatus and method for receiving Reed-Solomon (RS) code-based broadcast service in a Code Division Multiple Access (CDMA) mobile communication system.

2. Description of the Related Art

A mobile communication system has developed from an early system that provides a voice service into an improved system that can provide a data service. The mobile communication system is evolving into a system capable of providing broadcast service along with various data services. The system that provides broadcast service is now undergoing various standardizations in $3^{rd}$ Generation Partnership Project 2 (3GPP2). Broadcast service defined in the CDMA2000 1× Rev. D standard among the standards proposed by 3GPP2 to provide broadcast service is called "Broadcast Multicast Service (BCMCS)." 3GPP2 has established other standards as well as the CDMA2000 1× Rev. D standard to provide broadcast service.

A description will now be made of the broadcast service defined in the CDMA2000 1× Rev. D standard the entire contents of which is hereby incorporated by reference. In the following description, the BCMCS service defined in the CDMA2000 1× Rev. D standard will be referred to as a "data service."

The broadcast service uses a block interleaving method, and block-interleaved data for various broadcast services is transmitted over one channel on a Time Domain Multiplex (TDM) basis. The broadcast service uses a Reed-Solomon (RS) code as an outer code in addition to an inner code. If the broadcast service data is transmitted using the TDM scheme, a receiving party can selectively receive a minimum possible number of frames, thereby improving its efficiency.

However, the TDM method has the foregoing advantage when no outer code is applied. That is, in the current standard in which the RS code is used as an outer code, the receiving party should receive even the undesired service data. With reference to the accompanying drawing, a description will now be made of the current broadcast service scheme.

FIG. 1 is a timing diagram for a description of a method for providing broadcast service on a TDM basis according to the CDMA2000 1× Rev. D standard.

In FIGS. 1, A, B, C and D represent types of broadcast services. As illustrated in FIG. 1, a base station TDM-multiplexes provided broadcast services before transmission. The TDM-multiplexed broadcast service has a TDM period TDM_PERIOD 100. The TDM period 100 includes TDM slots therein. A predetermined number of the TDM periods constitute a TDM super period TDM_SUPER_PERIOD.

A method of providing broadcast service will now be described. A user terminal, when it desires to receive a particular broadcast service, can identify a type of a TDM-multiplexed broadcast service transmitted over a particular channel. If a user desires to view a particular broadcast service after identifying a type of the broadcast service, the user terminal receives TDM-multiplexed broadcast service information, shown in FIG. 1, transmitted by the base station. Information used for receiving the TDM-multiplexed broadcast service data is shown in Table 1 below, and Table 2 and Table 3 are provided to give a description of the information shown in Table 1.

Table 1 shows an exemplary format of a Broadcast Service Parameter Message (BSPM) used for transmitting TDM-multiplexed BCMCS service defined in the CDMA2000 1× Rev. D standard. Table 2 shows a matching relationship between TDM slot length parameters and TDM length parameters for the information shown in Table 1. Table 3 shows TDM slot lengths matched to their associated TDM super periods.

TABLE 1

| Message Field | Number of Bits |
|---|---|
| TDM_USED_IND | 1 |
| TDM_SLOT_LENGTH | 0 or 2 |
| TDM_PERIOD | 0 or 2 |
| TDM_MASK | 0 or (4, 8 or 16) |
| TDM_SUPER_PERIOD_MASK | 0 or 4 |

In Table 1, TDM_USED_IND has 1 bit, and indicates whether corresponding broadcast service is TDM-multiplexed before being transmitted. If the broadcast service data is TDM-multiplexed before being transmitted, its following field values are added. For the other fields shown in Table 1, if the number of bits is '0', it means that TDM is unused. In Table 1, TDM_SLOT_LENGTH 110 has 2 bits when TDM is used, and indicates a length of TDM slots included in one TDM period 100 shown in FIG. 1. TDM_PERIOD in Table 1 indicates the number of slots included in a TDM period, and has a 2-bit value when TDM is used. TDM_MASK has a value of 4 bits, 8 bits or 16 bits, and indicates in which slot the broadcast service requested by the user is included in the TDM period 100. In FIG. 1, reference numeral 120 represents the case in which a TDM_MASK value is set with 4 bits. Finally, TDM_SUPER_PERIOD_MASK has a 0-bit or 4-bit value depending on whether a super frame is used or not. When the super frame period is used, a super frame period mask value is set to a 4-bit value, as shown by reference numeral 130 in FIG. 1.

TABLE 2

| TDM_SLOT_LENGTH (binary) | Length of the TDM slot | TDM_PERIOD (binary) | TDM period |
|---|---|---|---|
| 00 | 20 ms | 00 | 4 slots |
| 01 | 40 ms | 01 | 8 slots |
| 10 | 80 ms | 10 | 16 slots |
| 11 | Reserved | 11 | Reserved |

Table 2 shows TDM slot length values matched to their associated TDM period values. Among the TDM slot length values, 'Reserved' denotes an unused value.

TABLE 3

| Slot Length | TDM period | | |
|---|---|---|---|
| | 4 slots | 8 slots | 16 slots |
| 20 ms (1 frame) | 16 frames | 32 frames | 64 frames |
| 40 ms (2 frames) | 32 frames | 64 frames | 128 frames |
| 80 ms (4 frames) | 64 frames | 128 frames | 256 frames |

Table 3 shows a matching relationship between the number of slots included in a TDM period and the number of frames transmitted according to a slot length in one TDM super period. It can be noted from Table 3 that a minimum of 16 frames through a maximum of 256 frames are available in one TDM super period according to the number of slots of the TDM period 100 and a length of one slot.

The user terminal, once it receives the information of Table 1, can receive data of a corresponding frame. A detailed description thereof will be made with reference to FIG. 1. When a particular user desires to receive a broadcast service A, a value denoted by reference numeral 121 is transmitted as a TDM_MASK value of Table 1. That is, a TDM_MASK value of '1010' denoted by reference numeral 121 is transmitted as a TDM_MASK value transmitted to a terminal that desires to view a broadcast service A. Similarly, a TDM_MASK value of '0100' denoted by reference numeral 122 is transmitted as a TDM_MASK value transmitted to a terminal that desires to view a broadcast service B, a TDM_MASK value of '0001' denoted by reference numeral 123 is transmitted as a TDM_MASK value transmitted to a terminal that desires to view a broadcast service C, and a TDM_MASK value of '1010' denoted by reference numeral 124 is transmitted as a TDM_MASK value transmitted to a terminal that desires to view a broadcast service D.

In this case, it is not possible to distinguish between the broadcast service A and the broadcast service D with only the TDM_MASK. Instead, the broadcast service A and the broadcast service D are distinguished by TDM_SUPER_PERIOD_MASK values. That is, TDM_SUPER_PERIOD_MASK values are set for the broadcast services A, B, C and D as shown by reference numeral 130 of FIG. 1, and the TDM_SUPER_PERIOD_MASK values each indicate in which TDM period the corresponding broadcast service is transmitted, as shown by reference numerals 131, 132, 133 and 134.

It is provided in the CDMA2000 1x Rev. D standard that RS outer codes are used for broadcast services. As specified in the BCMCS physical layer standard, the RS outer code has a 64-frame period and the 64 frames constitute 4 sub-buffers. With reference to FIG. 2, a description will now be made of a broadcast service scheme using RS outer codes.

FIG. 2 is a diagram for a description of a method for RS-encoding broadcast service data with an outer code according to the CDMA2000 1x Rev. D standard.

FIG. 2 illustrates 4 sub-buffers including a sub-buffer0 210, a sub-buffer1 220, a sub-buffer2 230, and a sub-buffer3 240, specified in the standard. As specified in the physical layer standard for broadcast service, because 64 frames constitute one frame, the 4 sub-buffers 210, 220, 230 and 240 are constructed such that they can store a total of 64 frames. Therefore, each of the sub-buffers 210, 220, 230 and 240 is constructed such that it can store 16 frames. Actually, however, the number of frames stored in each of the buffers 210, 220, 230 and 240 becomes a predetermined number k (an integer smaller than 16). The reason for this is to perform RS encoding. When broadcast service is provided, a set of the k is defined as 11, 12, 13 and 14. Therefore, in each of the sub-buffers 210, 220, 230 and 240 of FIG. 2, first k frames are stored and the other areas are kept empty. In the areas where no frame is stored, parity frames which are RS-encoded frames are stored. In this manner, each of the sub-buffers 210, 220, 230 and 240 is filled with 16 frames. In FIG. 2, this process is denoted by an RS encoding process. That is, reference numerals 211, 221, 231 and 241 of FIG. 2 show buffer states after the RS-encoding.

The sub-buffers 211, 221, 231 and 241 including the RS-encoded frames output the broadcast data in regular sequence in order to perform block interleaving. A description will now be made of a process of block-interleaving broadcast data and outputting frames.

After a first frame output from the first sub-buffer 211 is transmitted, a first frame from the second sub-buffer 221 is transmitted, and then a first frame of the third sub-buffer 231 is transmitted. Finally, after a first frame of the fourth sub-buffer 241 is transmitted, a second frame of the first sub-buffer 211 is transmitted.

Frames in buffers 212, 222, 232 and 242 shown in the right-hand side of FIG. 2 are assigned unique numbers of '0' through '63' in transmission order of the broadcast frames stored in the sub-buffers 211, 221, 231 and 241. That is, a transmission order assigned to the frames stored in the first sub-buffer 211 is denoted by reference numeral 212, a transmission order assigned to the second sub-buffer 211 is denoted by reference numeral 222, a transmission order assigned to the third sub-buffer 231 is denoted by reference numeral 232, and a transmission order assigned to the fourth sub-buffer 241 is denoted by reference numeral 242. As to the first sub-buffer 211, a first frame is transmitted first, a second frame is transmitted fifth, and a third frame is transmitted ninth. Even the frames stored in the other sub-buffers 221, 231 and 241 are transmitted in the same manner.

With reference to FIG. 3, a description will now be made of an exemplary method for transmitting the frames in a TDM super period and a TDM period.

FIG. 3 is a timing diagram for broadcast service data transmission for the case where data for 6 broadcast services is subject to TDM multiplexing and RS encoding before being transmitted. Referring to FIG. 3, a TDM super period 300 includes 4 TDM periods 310, 320, 330 and 340, and each of the TDM periods 310, 320, 330 and 340 transmits broadcast service frames A, B, C, D, E and F for different broadcast services.

In receiving the frames transmitted in the manner shown in FIG. 3, a terminal, which is a receiving party, should receive the data for each individual service buffer, and should receive even the other broadcast frames included in the sub-buffer in which its own broadcast service is included, before decoding the received data. The reason for this is because an RS code is used as an outer code as described with reference to FIG. 2.

A description thereof will be made with reference to FIG. 4. FIG. 4 is a diagram illustrating a method for storing transmission data in each sub-buffer for the case where broadcast service is provided in the method described with reference to FIG. 2.

Referring to FIG. 4, transmission data is stored in each of first through fourth sub-buffers 410, 420, 430 and 440. FIG. 4 shows an exemplary method for transmitting data in the method of FIG. 3. That is, frames for 3 broadcast services A, E and F are stored in the first sub-buffer 410, frames for 3 broadcast services A, B and F are stored in the second sub-buffer 420, frames for 2 broadcast services C and F are stored in the third sub-buffer 430, and frames for 2 broadcast services D and F are stored in the fourth sub-buffer 440. The last several frames in each of the sub-buffers 410, 420, 430 and 440 become parity frames for RS encoding. For example, for k=14, every sub-buffer transmits 2 parity frames. Therefore, data for the last two broadcast services A and E in the first sub-buffer 410 of FIG. 4 actually becomes parity frames generated by broadcast services A, E and F, instead of the broadcast services A and E. This is applied in the same way even to the other buffers 420, 430 and 440.

Therefore, a terminal desiring to receive a particular broadcast service cannot have the advantage of the TDM due to the frames transmitted in the foregoing manner. This is because the terminal cannot perform RS decoding unless it receives all data in the sub-buffer in which its desired broadcast service is included. In addition, RS-encoded frames are sequentially transmitted one by one for each buffer as described with reference to FIG. 2. That is, the RS-encoded frames are transmitted after being block-interleaved. Therefore, it is difficult to correctly determine in which buffer the actual transmission frame is included. These problems were caused because they were not taken into consideration for the broadcast service during the CDMA2000 1× Rev. D standardization.

SUMMARY OF THE INVENTION

It is, therefore, an object of the present invention to provide an apparatus and method to facilitate distinguishing desired data in receiving broadcast service transmitted after being RS-encoded.

It is another object of the present invention to provide an apparatus and method to facilitate providing information to receive only the necessary data in receiving broadcast service that uses TDM multiplexing and uses RS encoding as outer encoding.

It is further another object of the present invention to provide a method for increasing the number of TDM channels by increasing a minimum number of broadcast parameter messages.

According to one exemplary aspect of the present invention, there is provided a method for providing a broadcast parameter message in a mobile communication system providing a broadcast service. According to the method, if the provided broadcast service is time domain multiplex (TDM)-multiplexed in one sub-buffer, the broadcast parameter message is generated by setting a field indicating the TDM multiplexing The method further comprises setting a field indicating a position of the broadcast service in the sub-buffer, being provided in the system, setting a field indicating whether the one sub-buffer includes one service and a field indicating validity of the field, and setting a field exclusively indicating actual broadcast service data stored in one sub-buffer. The broadcast parameter message is modulated and the modulated broadcast parameter message is provided to a terminal that receives the broadcast service.

According to another exemplary aspect of the present invention, there is provided an apparatus for providing a broadcast parameter message in a mobile communication system providing a broadcast service. The apparatus comprises a message generator for, if the provided broadcast service is time domain multiplex (TDM)-multiplexed, generating the broadcast parameter message by setting a field indicating the TDM multiplexing, setting a field indicating a position of the broadcast service in each sub-buffer, setting a field indicating whether one sub-buffer includes one service and a field indicating validity of the field, and setting a field exclusively indicating actual broadcast service data stored in one sub-buffer. A transmitter for modulating the broadcast parameter message and providing the modulated broadcast parameter message to a terminal that receives the broadcast service is also provided.

According to yet another exemplary aspect of the present invention, there is provided a method for receiving a broadcast service provided in a mobile communication system. The method comprises determining a position of a desired broadcast service by receiving a field indicating whether the provided broadcast service is time domain multiplex (TDM)-multiplexed in one sub-buffer, a field indicating a position of the broadcast service in the sub-buffer, being provided in the system, a field indicating whether the one sub-buffer includes one service and a field indicating validity of the field, and a field exclusively indicating actual broadcast service data stored in one sub-buffer. A broadcast service is received in the determined position.

According to yet another exemplary aspect of the present invention, there is provided an apparatus for receiving a broadcast service provided in a mobile communication system. The apparatus comprises a radio frequency (RF) unit for receiving a broadcast service and a parameter indicating a position of a desired broadcast service. The apparatus further comprises a demodulator for demodulating the broadcast service and the parameter, and a controller for performing a control operation of selecting a received broadcast service using the parameter having a field indicating whether the provided broadcast service is time domain multiplex (TDM)-multiplexed in one sub-buffer, a field indicating a position of the broadcast service in the sub-buffer, being provided in the system, a field indicating whether the one sub-buffer includes one service and a field indicating validity of the field, and a field exclusively indicating actual broadcast service data stored in one sub-buffer.

BRIEF DESCRIPTION OF THE DRAWINGS

The above and other objects, features and advantages of the present invention will become more apparent from the following detailed description when taken in conjunction with the accompanying drawings in which like reference numerals will be understood to refer to like parts, components and structures, where:

FIG. 3 is a timing diagram for broadcast service data transmission for the case where data for 6 broadcast services is subject to TDM multiplexing and RS encoding before being transmitted;

FIG. 4 is a diagram illustrating a method for storing transmission data in each sub-buffer for the case where broadcast service is provided in the method described with reference to FIG. 2;

FIG. 7 is a timing diagram for a description of a method for providing TDM broadcast service based on sub-buffers according to a first exemplary embodiment of the present invention;

FIG. 8 is a diagram illustrating an exemplary method for filling one sub-buffer with a plurality of service channels according to a second exemplary embodiment of the present invention;

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

An exemplary implementation of the present invention takes into account a method of storing frames for only one broadcast service in one sub-buffer. A description will now be made of the method of storing frames for only one broadcast service in one sub-buffer.

Figure 5:
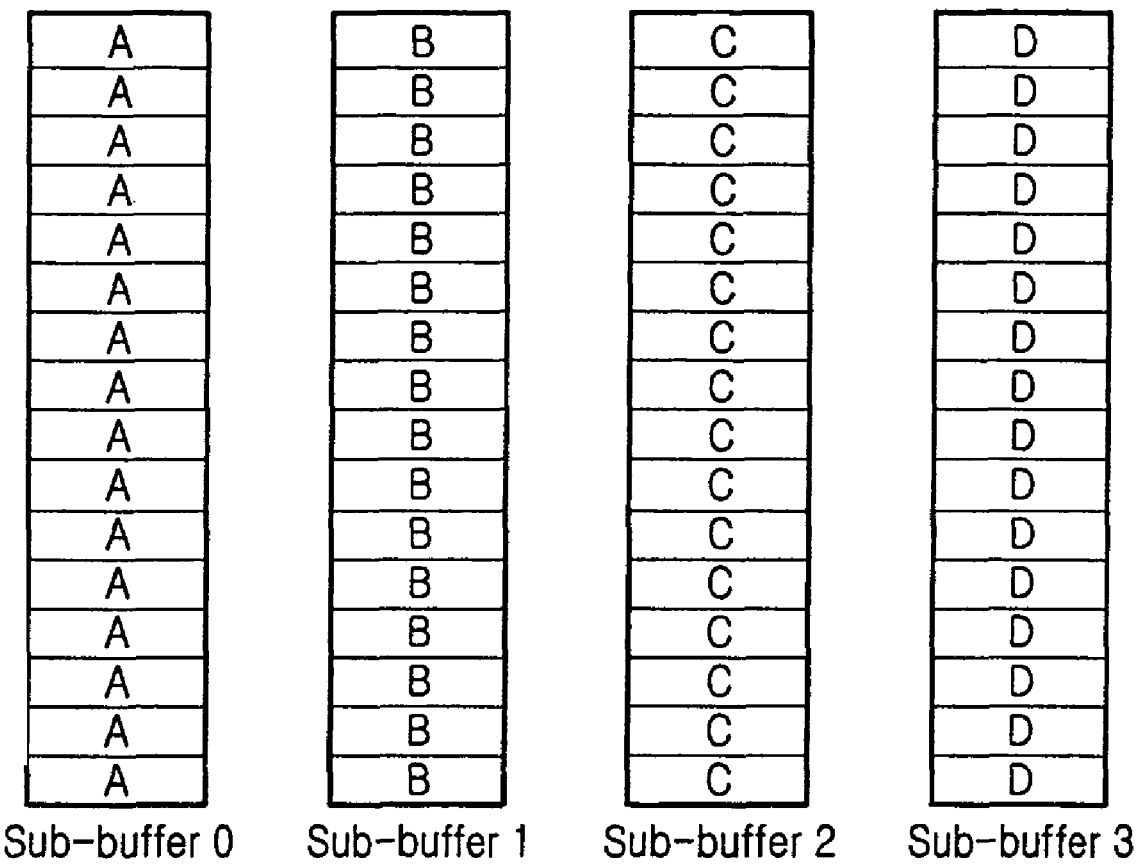
FIG. 5 is a diagram illustrating an exemplary method of storing frames for only one broadcast service in every sub-buffer.

FIG. 5 is a diagram illustrating an exemplary method of storing frames for only one broadcast service in every sub-buffer. As described above, it is assumed in FIG. 5 that there are 4 sub-buffers. Although letters A, B, C and D represent different broadcast services in FIG. 5, it is not necessary that they should represent different broadcast services. For example, there are possible frames, in each of which A and B constitute one service. Therefore, FIG. 5 illustrates the maximum number of separable service types. Although the maximum possible number of services is 4 in the method of storing frames for each individual broadcast service in the manner of FIG. 5, the services can be transmitted in different methods.

FIGS. 6A through 6F are diagrams illustrating possible configurations for storing the same broadcast services in one buffer and TDM-multiplexing the broadcast services before transmission. With reference to FIGS. 6A through 6F and Table 4 below, a description will now be made of possible types for TDM transmission. Table 4 shows the maximum possible number of services for each individual type.

TABLE 4

| Slot Length | TDM period | | |
|---|---|---|---|
| | 4 slots | 8 slots | 16 slots |
| 20 ms (1 frame) | 4 (I) | 4 (II) | 4 (III) |
| 40 ms (2 frames) | 2 (IV) | 2 (V) | 4 (VI) |
| 80 ms (4 frames) | 1 (VII) | 2 (VIII) | 4 (IX) |

Figure 6A:
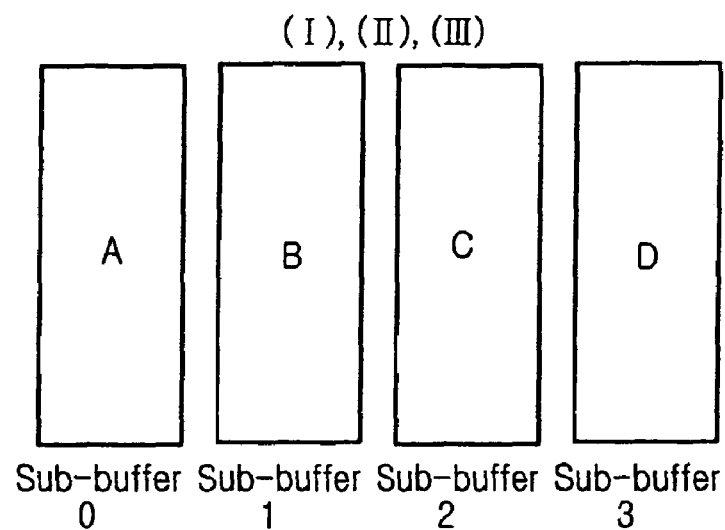
FIGS. 6A through 6F are diagrams illustrating possible types of storing only the same broadcast services in one buffer and TDM-multiplexing the broadcast services before transmission.
Figure 6B:
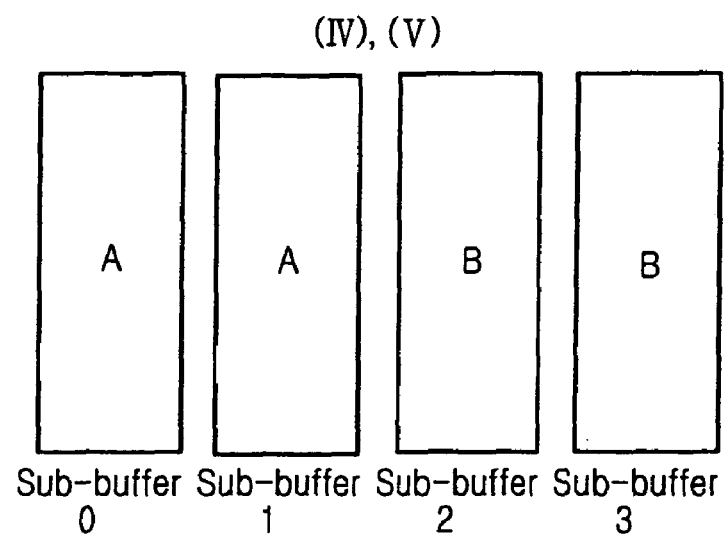
Figure 6C:
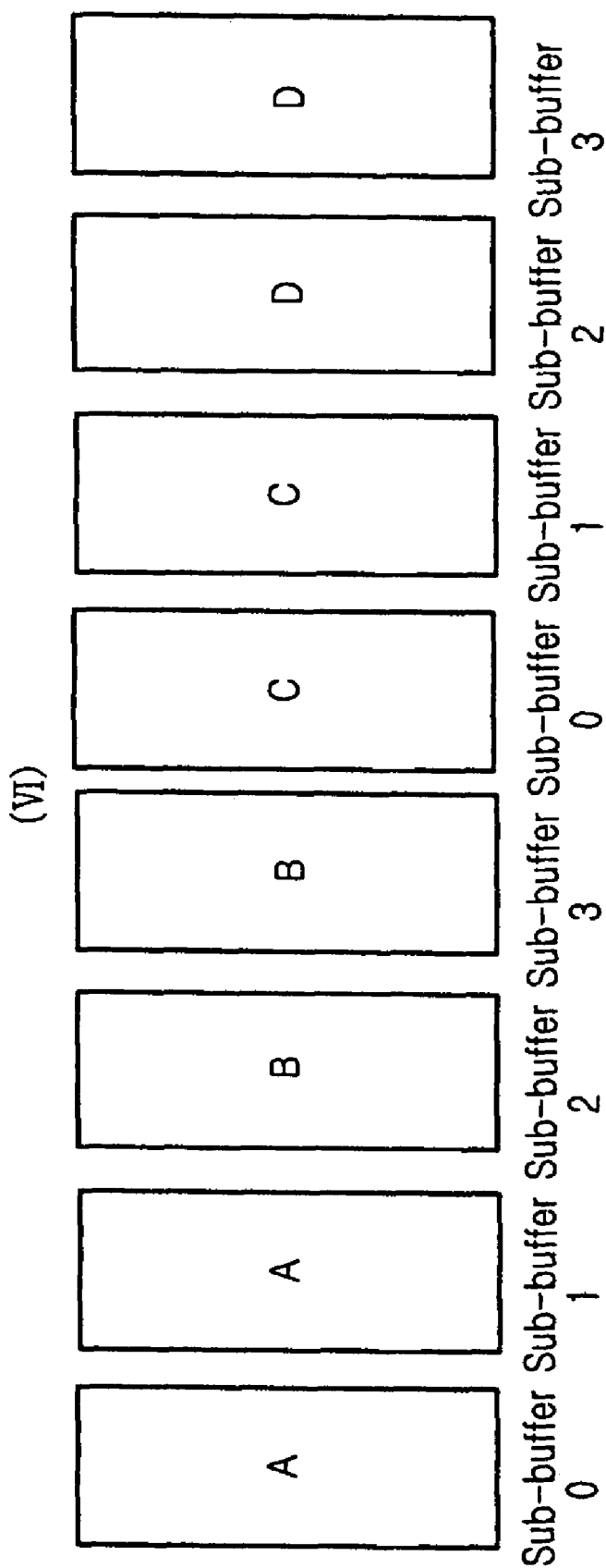
Figure 6D:
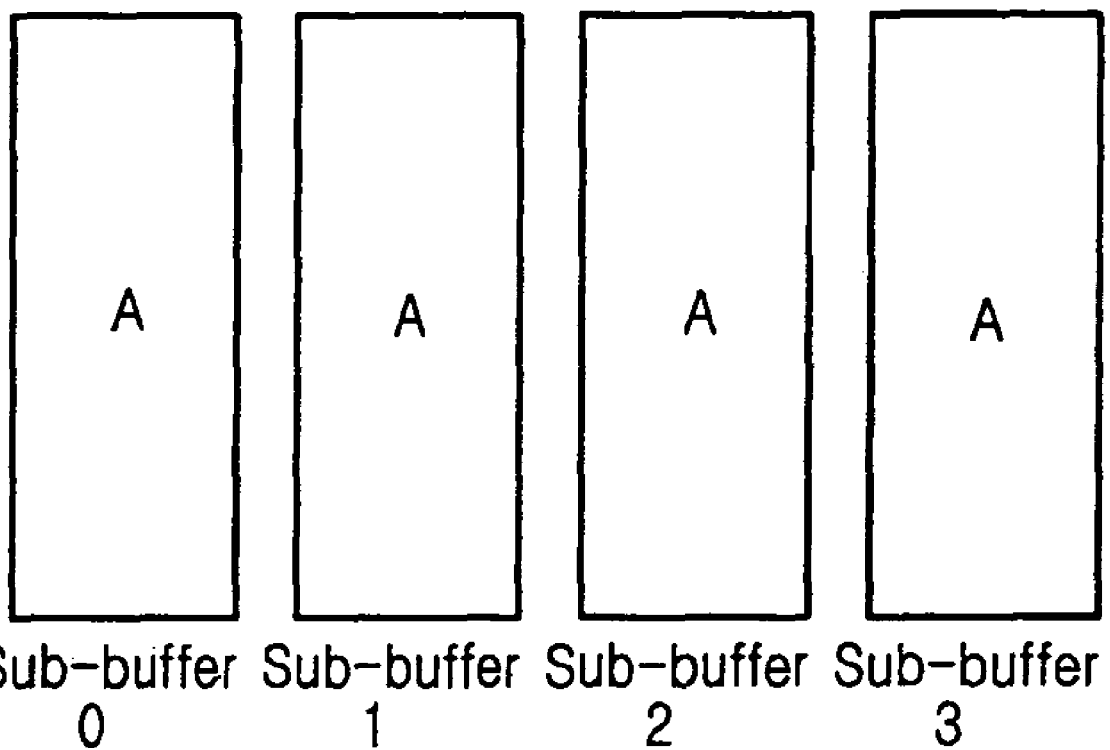
Figure 6E:
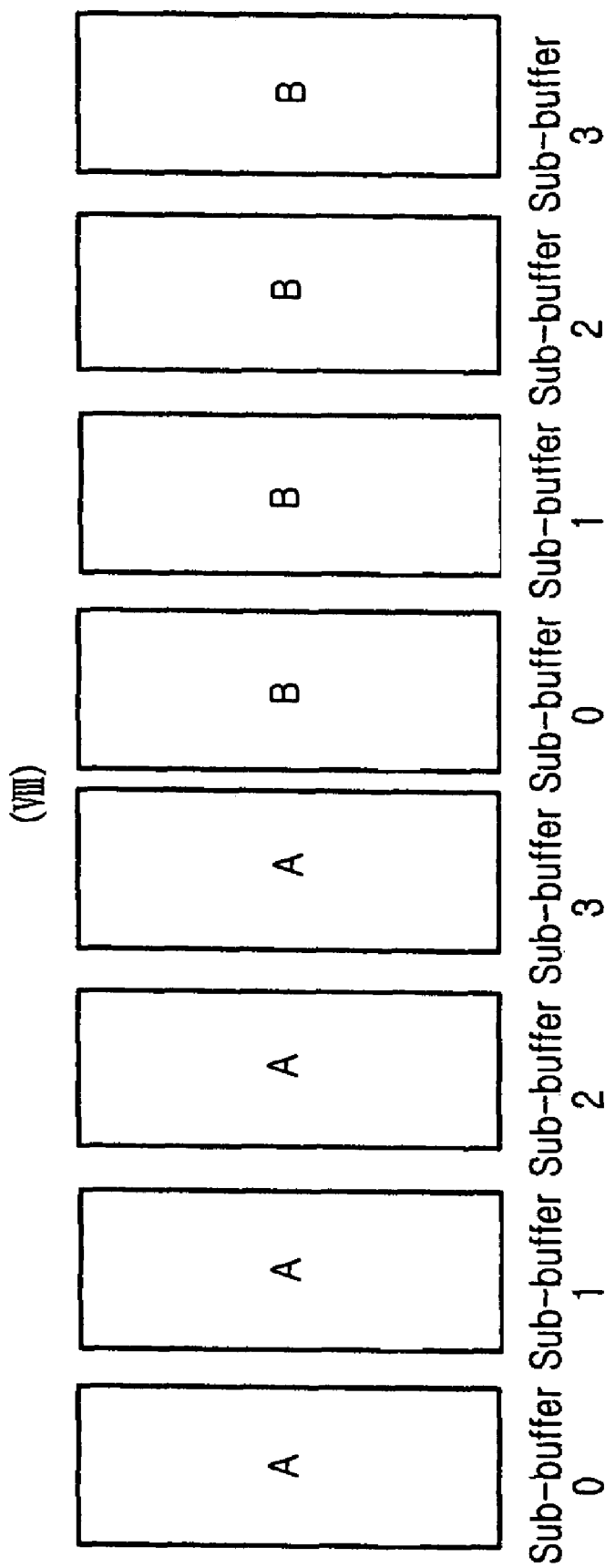
Figure 6F:
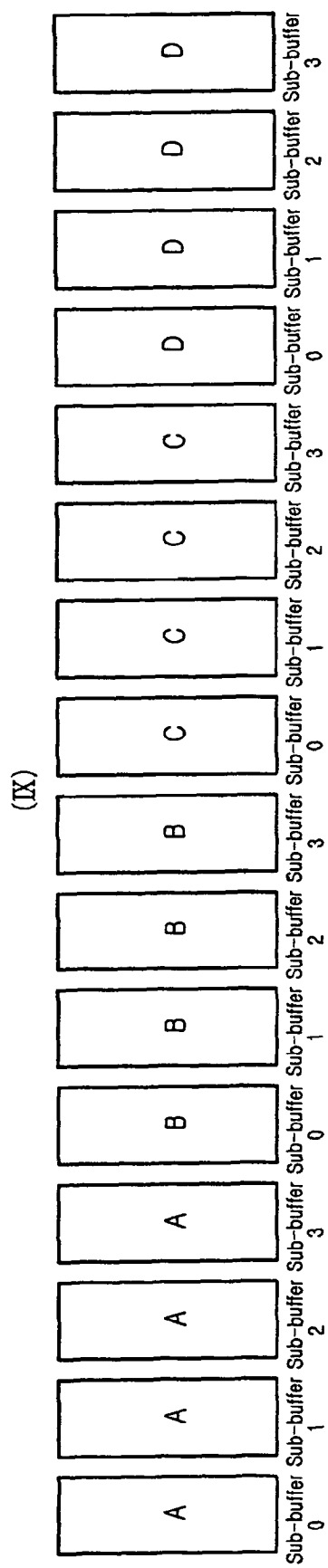

In Table 4, Types (I), (II) and (III) all have a TDM slot length of 20 ms and have 4, 8 and 16 slots, respectively. In this case, the maximum possible number of services is 4 (A, B, C and D) as shown in FIG. 6A. Types (IV) and (V) both have a TDM slot length of 40 ms and have 4 and 8 slots, respectively. In this case, the maximum possible number of services is 2 (A and B) as shown in FIG. 6B. Type (VI) has a TDM slot length of 40 ms and has 16 slots. In this case, the maximum possible number of services is 4 (A, B, C and D) as shown in FIG. 6C. Summarizing Table 4 in this manner, Type (VII) can provide one service, and Types (IV), (V) and (VIII) can provide up to 2 services, and Types (I), (II), (III), (VI) and (IX) can provide up to 4 services. Therefore, it is possible to obtain good results from FIGS. 6A through 6F and Table 4.

1. Types (I), (II) and (III) all represent the same TDM multiplexing. In this case, they are represented by Type (I) because Type (I) requires the least number of message bits. The term "message" as used herein refers to a "broadcast service parameter message (BSPM)" that is transmitted from a base station to a terminal, which is a receiving party, along with parameter information of Table 1, so that the terminal can use broadcast services.

2. Types (IV) and (V) are represented by Type (I) because they can be expressed by Type (1).

3. Type (VI) is unique.

4. Type (VII) can provide only one service using 4 buffers.

5. Type (VIII) is represented by Type (VI) because it can be expressed by Type (VI).

6. Type (IX) is unique.

Therefore, an efficient TDM transmission scheme can be fully expressed with only Types (I), (VI) and (IX) under the scheme of the existing broadcast service parameter message, shown in Table 1 and Table 2. Given that the shortest transmission delay time is guaranteed when the services are uniformly mixed, Type (I) is most superior and it can represent the other 8 types. However, the maximum number of services supported by Type (I), as it is limited to 4, cannot reach 64, which is possible when the efficient TDM transmission scheme is not taken into consideration. However, if TDM multiplexing is taken into account in terms of outer decoding, it can be noted that the foregoing transmission scheme is very efficient.

Therefore, a first exemplary embodiment of the present invention proposes a method and apparatus for efficiently receiving broadcast data transmitted using an RS code, with the TDM transmission shown in FIG. 5 being kept, and transmitting broadcast data obtained by modifying the broadcast service parameter message so that it can accommodate broadcast channels, the number of which is expected to greatly increase in the future. To this end, the present invention allows a TDM mask TDM_MASK of Table 1, designating frames for each individual broadcast service, to designate each sub-buffer, and stores frames for only one broadcast service in each sub-buffer without storing frames for other broadcast services therein, thereby preventing the unnecessary decoding process from conventionally occurring at the receiving party.

Table 5 shows a format of the broadcast service parameter message proposed in the first embodiment of the present invention. The broadcast service parameter message follows the following principle.

1. A signaling scheme for the case where an outer code is used should be different from a signaling scheme for the case where the outer code is unused, in order to support flexible TDM when the outer code is unused.

2. One service should exist in each sub-buffer when the outer code is used. To this end, the broadcast service parameter message should have a sub-buffer-based mask rather than a frame-based mask.

TABLE 5

| Message Field | Number of Bits |
|---|---|
| TDM_USED_IND | 1 |
| TDM_SUB_BLOCK_LENGTH | 0 or 2 |
| TDM_SUB_BLOCK_PERIOD | 0 or 2 |
| TDM_SUB_BLOCK_MASK | 0 or (4, 8 or 16) |
| TDM_SUB_BLOCK_SUPER_PERIOD_MASK | 0 or 4 |

Because Table 5 is equal to Table 1 in Number of Bits, the new broadcast service parameter message is compatible with the conventional broadcast service parameter message. Compared with the fields of the conventional broadcast service parameter message of Table 1, all fields of the new broadcast service parameter message are changed in units of sub-buffers and their basic contents remain unchanged. Therefore, the receiving party actually receiving a broadcast service can analyze the broadcast service with either one of the two different types of fields according to whether an outer code is used or not.

Figure 1:
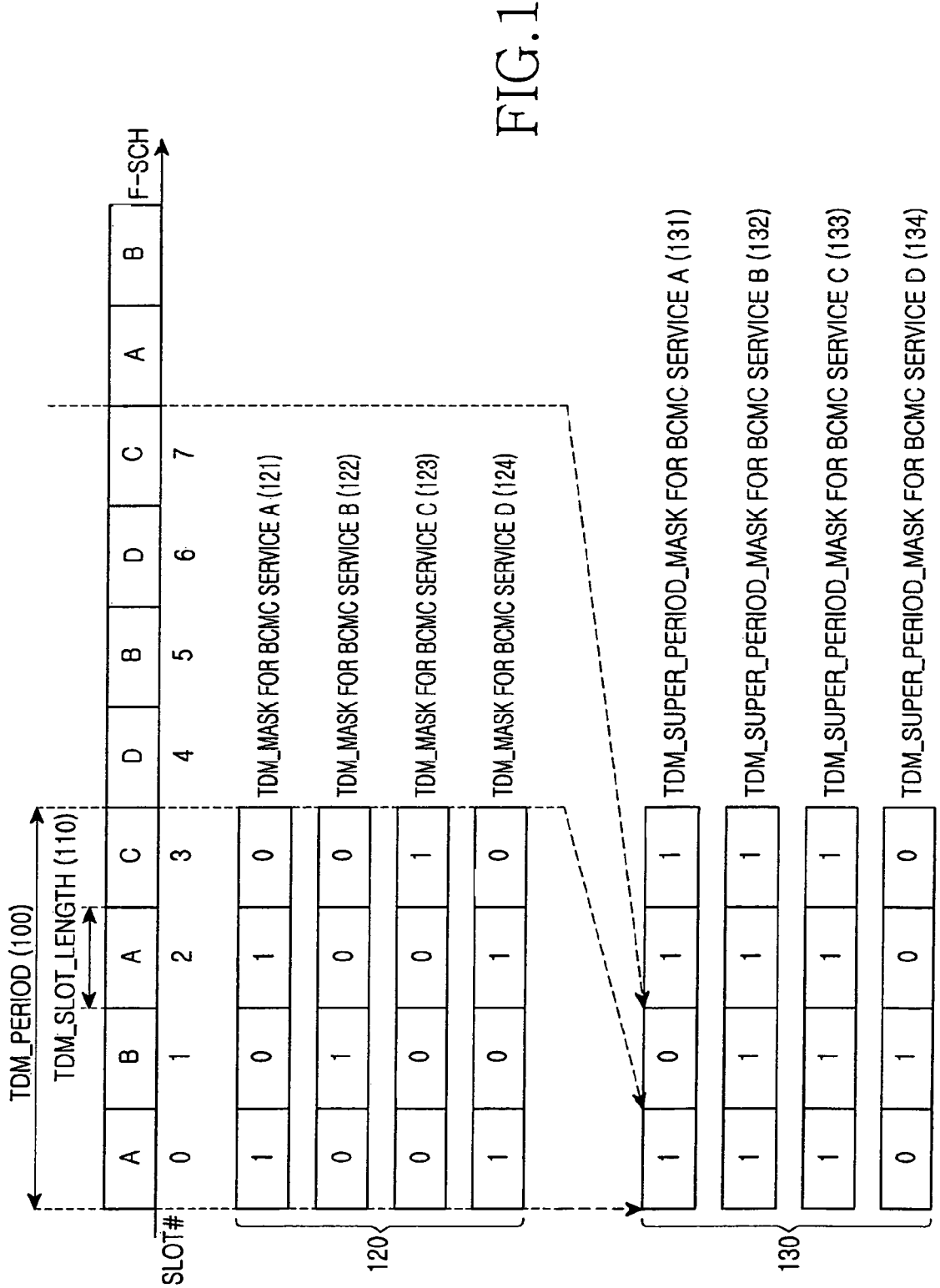
FIG. 1 is a timing diagram for a description of a method for providing broadcast service on a TDM basis according to the CDMA2000 1× Rev. D standard.
Figure 2:
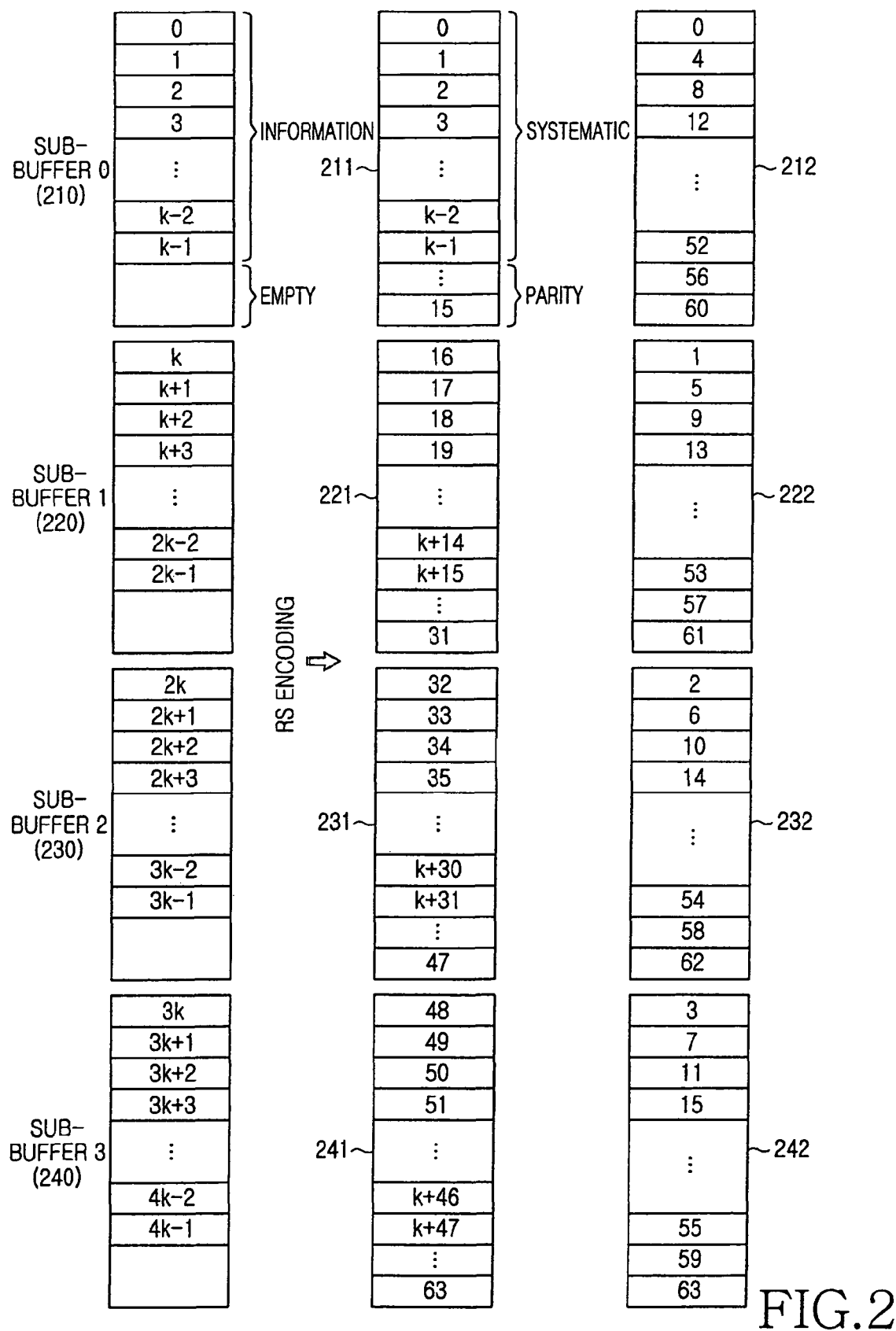
FIG. 2 is a diagram for a description of a method for RS-encoding broadcast service data with an outer code according to the CDMA2000 1× Rev. D standard.

FIG. 7 is a timing diagram for a description of a method for providing TDM broadcast service based on sub-buffers according to the first exemplary embodiment of the present invention. This method may follow the existing CDMA2000 1× Rev. D standard of FIG. 1, except for the sub-buffer-based broadcast frame transmission/reception scheme.

In FIG. 7 in which TDM is used, a TDM sub-buffer length TDM_SUB_BLOCK_LENGTH 710 shown in Table 5 has a 2-bit value, and indicates a length of the time included in one TDM sub-buffer period TDM_SUB_BLOCK_PERIOD 700 as shown in FIG. 7. The TDM sub-buffer period TDM_SUB_BLOCK_PERIOD 700 of Table 5 has a 2-bit value when TDM is used. In addition, a TDM sub-buffer mask TDM_SUB_BLOCK_MASK 720 has a 4-bit, 8-bit or 16-bit value, and indicates in which sub-buffer (711, 712, 713 or 714) the broadcast service requested by a user is included in a TDM period. Finally, a super frame period mask TDM_SUB_BLOCK_SUPER_PERIOD_MASK 730 has a 0-bit value or a 4-bit value according to whether TDM is used or not.

In FIG. 7, the TDM sub-buffer mask with 4 bits is denoted by reference numeral 720. When a super frame period is used, the super frame period mask value can be occasionally set to a 4-bit value, as denoted by reference numeral 730.

As described above, FIG. 7 shows TDM based on sub-buffers 711, 712, 713 and 714. That is, a receiving party receives the broadcast service parameter message of Table 5 to calculate to which sub-buffer a received frame belongs, and then receives only the frames belonging to the corresponding sub-buffer. Herein, a sub-buffer index sub_block_index to which an $i^{th}$ received frame belongs is defined as $$\text{sub\_block\_index} = (i \bmod 4) + 4 \times (\lfloor i/64 \rfloor \bmod \text{TDM\_SUB\_BLOCK\_PERIOD}) \quad (1)$$

In Table 1, a value of i is 0 at a time after 20*FSCH_OUTER_CODE_OFFSETs[i] ms in a position where a CDMA2000 system time is 0. In addition, 'mod' denotes modulo operation, and the modulo operation for i/64 means a maximum integer not exceeding its value. According to Equation (1), for an arrangement of a sub-buffer mask in which one sub-buffer is mapped to one bit on a one-to-one basis, if a sub_block_index$^{th}$ value of the sub-buffer mask arrangement is '1', it means reception of an $i^{th}$ transmission frame, and if the sub_block_index$^{th}$ value of the sub-buffer mask arrangement is '0', it means non-reception of the $i^{th}$ transmission frame, thereby enabling TDM reception.

Values of both i and sub_block_index start from 0. For example, in FIG. 7, a sub-buffer mask arrangement for a service A is represented by 1,0,1,0,0,0,0,0,1,0,1,0,1,0,1,0. Therefore, a sub-buffer index of a 456$^{th}$ received frame is calculated as 12 in accordance with Equation (1) and a value of the corresponding sub-buffer mask is 1 (that is, 1,0,1,0,0, 0,0,0,1,0,1,0,"1",0,1,0), meaning that the corresponding frame is a frame that should be received.

If there is a need to superficially indicate whether the sub-buffer-based TDM is applied, it is possible to create a broadcast service parameter message in a method of Table 6 and Table 7 below using the reserved bits of Table 2. If the sub-buffer-based TDM is unconditionally applied when the outer code is used, such an operation is not required.

TABLE 6

| Message Field | Number of Bits |
| --- | --- |
| TDM_USED_IND | 1 |
| TDM_SLOT_LENGTH | 0 or 2 |
| TDM_SUB_BLOCK_PERIOD | 0 or 2 |
| TDM_SUB_BLOCK_MASK | 0 or (4, 8 or 16) |
| TDM_SUB_BLOCK_SUPER_PERIOD_MASK | 0 or 4 |

TABLE 7

| TDM_SLOT_LENGTH (binary) | Length of the TDM slot |
| --- | --- |
| 00 | 20 ms |
| 01 | 40 ms |
| 10 | 80 ms |
| 11 | TDM_SUB_BLOCK_USED |

With the use of Table 6 and Table 7, it is possible to support the sub-buffer-based TDM scheme, which is fully compatible with the conventional TDM scheme. Compared with Table 5, Table 6 does not include the TDM_SUB_BLOCK_LENGTH field existing in Table 5, meaning that its unit is always a sub-buffer unit. The maximum number of services supported by this scheme is 16×4=64, which is equal to that of the conventional scheme.

A second exemplary embodiment of the present invention will now be described. The second exemplary embodiment of the present invention takes into account the case where data for one broadcast service cannot fully fill one sub-buffer, that is, the case where one sub-buffer is filled with data for two or more broadcast services. This may include both the conventional technology and the first embodiment of the present invention.

The first exemplary embodiment of the present invention has taken into account the case where each sub-buffer is created in units of one TDM. Therefore, when a length of TDM_SUB_BLOCK_MASK is 16, 16×6=64 TDMs are possible. When there is a need for a large number of channels for these reasons, the second exemplary embodiment of the present invention can efficiently increase the number of channels.

FIG. 8 is a diagram illustrating an exemplary method for filling one sub-buffer with a plurality of service channels according to a second exemplary embodiment of the present invention. Compared with the first exemplary embodiment of the present invention in which one sub-buffer is filled with a single service channel, the second exemplary embodiment of the present invention shown in FIG. 8 fills one sub-buffer with a plurality of service frames.

The second exemplary embodiment of the present invention arranges a position of each service in a TDM_SUB_BLOCK_INNER_MASK field as shown in right-hand side of FIG. 8 so that it is possible to distinguish each service type. An exemplary broadcast service parameter message according to the second exemplary embodiment of the present invention is shown in Table 8. With reference to FIG. 8, a description will now be made of the broadcast service parameter message according to the second embodiment of the present invention.

TABLE 8

| Message Field | Number of Bits |
| --- | --- |
| TDM_SUB_BLOCK_PERIOD | 0 or 2 |
| TDM_SUB_BLOCK_MASK | 0 or (4, 8 or 16) |
| TDM_SUB_BLOCK_SUPER_PERIOD_MASK | 0 or 4 |
| TDM_SUB_BLOCK_INNER_MASK_INCL | 0 or 1 |
| TDM_SUB_BLOCK_INNER_MASK | 0 or (11, 12, 13 or 14) |

As to the broadcast service parameter message shown in Table 8, if broadcast service data is not TDM-transmitted in units of sub-blocks, sizes of all fields in Table 8 can be 0 because the message fields are not required. Otherwise, each field has the following meaning.

First, a TDM_SUB_BLOCK_PERIOD field='00' indicates that a period of a TDM sub-block is 4. In this case, a TDM_SUB_BLOCK_MASK field has a length of 4 bits. Second, a TDM_SUB_BLOCK_PERIOD field='01' indicates that a period of the TDM sub-block is 8. In this case, the TDM_SUB_BLOCK_MASK field has a length of 8 bits. Third, a TDM_SUB_BLOCK_PERIOD field='10' indicates that a period of the TDM sub-block is 16. In this case, the TDM_SUB_BLOCK_MASK field has a length of 16 bits. Finally, for a TDM_SUB_BLOCK_PERIOD field='11', the corresponding field is reserved as described above.

The TDM_SUB_BLOCK_MASK field indicates a position of a sub-block allocated for a service. Therefore, a TDM_SUB_BLOCK_MASK field='1' indicates a sub-block for a desired broadcast service, and a TDM_SUB_BLOCK_MASK field='0' indicates sub-blocks for undesired broadcast services.

A TDM_SUB_BLOCK_SUPER_PERIOD_MASK field can validate or invalidate the TDM_SUB_BLOCK_MASK field in units of 4 bits. A TDM_SUB_BLOCK_SUPER_PERIOD_MASK field='0' indicates that there is no sub-block being serviced for a TDM_SUB_BLOCK_PERIOD length duration of a corresponding order. On the contrary, TDM_SUB_BLOCK_SUPER_PERIOD_MASK field='1' indicates that there is a sub-block being serviced for a TDM_SUB_BLOCK_PERIOD length duration of a corresponding order and the sub-block follows a rule of the TDM_SUB_BLOCK_MASK field.

A TDM_SUB_BLOCK_INNER_MASK_INCL field is provided to include, for example, both the first exemplary embodiment of the present invention and the conventional technology. A TDM_SUB_BLOCK_INNER_MASK_INCL field='0' indicates that one sub-buffer is filled with one service. In this case, therefore, a length of the TDM_SUB_BLOCK_INNER_MASK field described below becomes 0. On the contrary, a TDM_SUB_BLOCK_INNER_MASK_INCL field='1' indicates that one sub-buffer is filled with one or more services in the form of the TDM_SUB_BLOCK_INNER_MASK field described below.

Finally, a TDM_SUB_BLOCK_INNER_MASK field, as described above, is included when the TDM_SUB_BLOCK_INNER_MASK_INCL field is set to '1' to fill one sub-buffer with two or more broadcast services. The TDM_SUB_BLOCK_INNER_MASK field indicates a service position in all sub-blocks allocated to one service. In order to reduce the number of transmission bits, the present invention sets the TDM_SUB_BLOCK_INNER_MASK field only for the systematic areas except for the parity area, in the process of setting each mask value indicating a position in a sub-block. Therefore, a mask length of the TDM_SUB_BLOCK_INNER_MASK field is set to one of 11, 12, 13 and 14, because it follows a length of systematic symbols of an RS code according to a standard for the corresponding RS code. Therefore, an inner_index indicating an $i^{th}$ received frame located in one sub-buffer can be calculated by $$\text{inner\_index} = \lfloor (i \bmod 64)/4 \rfloor \qquad (2)$$

In Equation (2), conditions for i are equal to those given in Equation (1). Therefore, a receiver can determine a position of its service according to the inner_index and the following conditions.

Condition 1: The receiver can determine a position of a service according to whether a corresponding mask value is '1', when the inner_index value has a value between 0 and (k-1).

Condition 2: $k^{th}$ through $(N-1)^{th}$ data corresponds to a parity area. Therefore, when an RS code is used, the receiver should receive all the data.

As described with reference to Table 8, two or more broadcast frames stored in one sub-buffer can be distinguished according to a value of the TDM_INNER_SUB_BLOCK_MASK field. Therefore, a length of the TDM_INNER_SUB_BLOCK_MASK field is equal to k which is the length of the systematic part. As described above, in the broadcast service standard, N=16 and k has one of 11, 12, 13 and 14. Therefore, once a value of the k is determined, the receiver can determine whether to receive it, even though the TDM_INNER_SUB_BLOCK_MASK field indicating the value is not generated and transmitted.

Turning back to FIG. 8, one sub-buffer 800 includes k broadcast service frames 801 and (N-k) parity frames 802. It is assumed in FIG. 8 that two or more broadcast services, for example, 6 broadcast services, are stored in one sub-buffer 800. FIG. 8 shows TDM_SUB_BLOCK_INNER_MASK fields 811, 812, . . . , 816 in its right-hand side, and inner_indexes in its rightmost-hand side.

With reference to FIG. 8 and Table 8, a description will now be made of a gain of the second embodiment of the present invention. If all sub-buffers have the TDM_SUB_BLOCK_INNER_MASK fields as illustrated in FIG. 8, the second exemplary embodiment of the present invention, compared with the first exemplary embodiment of the present invention in which a sub-buffer is filled with a single service, can reduce a size of the broadcast service parameter message because there is no need to transmit k bits in generating the message of Table 8. In addition, when one sub-buffer is filled with only one broadcast service according to the first exemplary embodiment of the present invention, the second exemplary embodiment of the present invention can prevent the unnecessary transmission of the TDM_SUB_BLOCK_INNER_MASK field by setting the TDM_SUB_BLOCK_INNER_MASK_INCL field of Table 8 to '0'.

A description will now be made of a structure of a transmission apparatus, for example, a transmission stage of a base station, according to another exemplary embodiment of the present invention.

Figure 10:
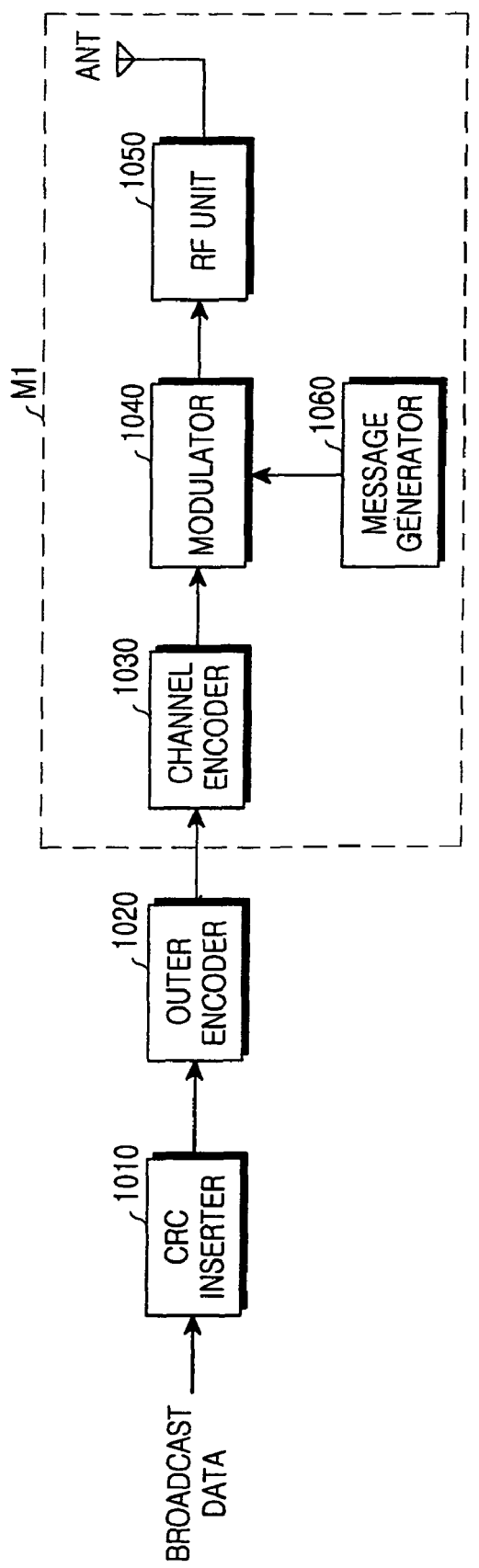
FIG. 10 is a block diagram illustrating a structure of an apparatus for transmitting broadcast data using an RS code according to an exemplary embodiment of the present invention.

FIG. 10 is a block diagram illustrating a structure of an apparatus for transmitting broadcast data using an RS code according to an exemplary embodiment of the present invention. Although the first and second exemplary embodiments of the present invention are implemented to generate the broadcast service parameter message through, for example, a base station that serves as a transmission party, the broadcast service parameter message can also be generated using a separate device such as a broadcast server.

If there is a need to provide a broadcast service to a terminal, the transmission apparatus of FIG. 10 generates and transmits the broadcast service parameter message to the terminal, and transmits broadcast data for each individual broadcast service to a wireless network in the method of FIG. 7 or FIG. 8.

A description of FIG. 10 will first be made for exemplary implementation of the first exemplary embodiment of the present invention, and then additionally made for the second exemplary embodiment of the present invention.

For transmission of broadcast data, a message generator 1060 generates, for TDM transmission, a broadcast parameter message of Table 5 including information bits for a super frame period mask TDM_SUB_BLOCK_SUPER_PERIOD_MASK and a TDM sub-block length TDM_SUB_BLOCK_LENGTH shown in FIG. 7 and also including a TDM sub-block mask TDM_SUB_BLOCK_MASK indicating in which sub-buffer the frame for the broadcast service requested by the user is included in the TDM period, and outputs the broadcast parameter message to a modulator 1040. The modulator 1040 modulates the broadcast parameter message output from the message generator 1060, and outputs the modulated message to a radio frequency (RF) unit 1050. The RF unit 1050 transmits the modulated message to a wireless network via an antenna ANT. An operation of a terminal receiving the broadcast parameter message will be described later.

After the transmission of the broadcast parameter message is completed, a cyclic redundancy check (CRC) inserter 1010 inserts CRC bits for error check into broadcast data, and outputs the CRC-inserted broadcast data to an outer encoder 1020. The outer encoder 1020 performs RS encoding on the input broadcast data so that it can be TDM-transmitted in units of sub-buffers, and outputs the RS-encoded broadcast data to a channel encoder 1030. The channel encoder 1030 performs channel encoding such as convolutional coding on the input signal, and outputs the channel-encoded signal to the modulator 1040. The modulator 1040 modulates the channel-encoded signal and transmits the modulated signal to the wireless network via the RF unit 1050 and the antenna ANT. The modulator 1040 can use a selected one of known modulation schemes. In FIG. 10, reference numeral MI denotes a broadcast parameter message transmission apparatus.

In the second exemplary embodiment of the present invention, the message generator 1060 generates a message shown in Table 8, and outputs the message to the modulator 1040. The modulator 1040 modulates the message using a predetermined modulation scheme, and outputs the modulated message to the RF unit 1050. The RF unit 1050 up-converts the modulated message into an RF signal and transmits the RF signal to the terminal.

Figure 9:
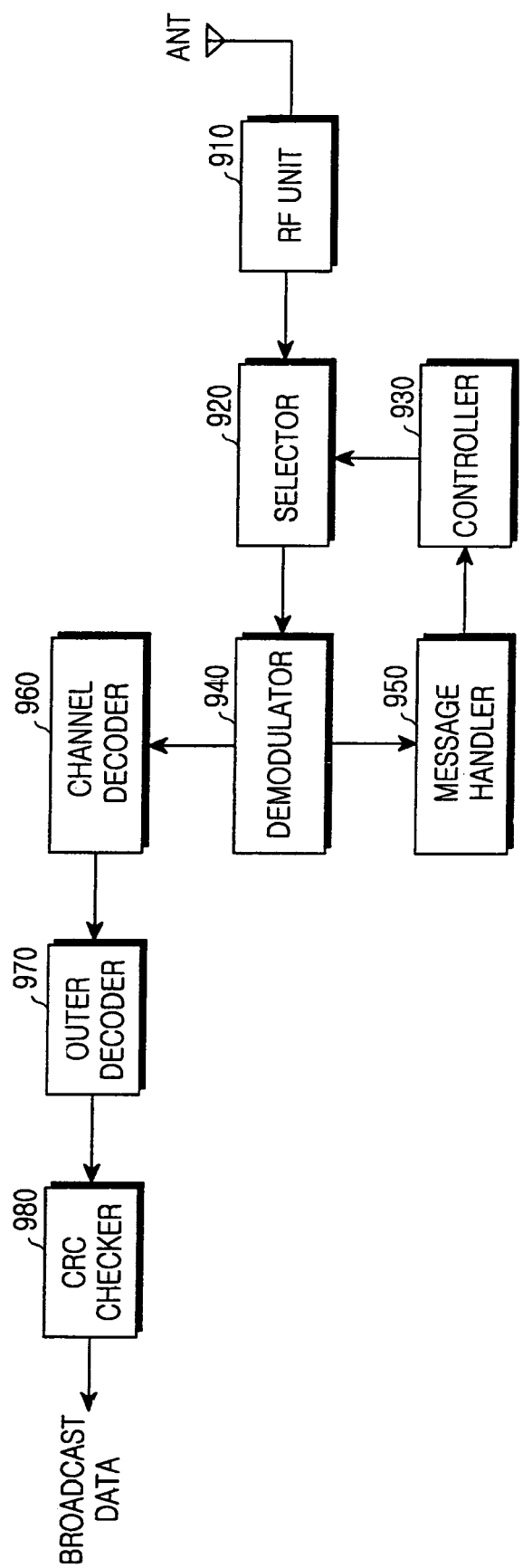
FIG. 9 is a block diagram illustrating a structure of an apparatus for receiving broadcast data using an RS code in a mobile communication system according to an exemplary embodiment of the present invention.

With reference to FIG. 9, a description will now be made of a structure of a reception apparatus, for example a reception stage of a terminal, according to yet another exemplary embodiment of the present invention. Similarly, a description of FIG. 9 will first be made for an exemplary implementation of the first exemplary embodiment of the present invention, and then made for the second exemplary embodiment of the present invention.

FIG. 9 is a block diagram illustrating a structure of an apparatus for receiving broadcast data using an RS code in a mobile communication system according to an exemplary embodiment of the present invention.

The reception apparatus of FIG. 9 receives a broadcast parameter message of Table 5 from a base station through an antenna ANT and an RF unit 910 including a filter and a front-end-unit, in response to a broadcast service request of a user, and delivers the received broadcast parameter message to a demodulator 940 via a selector 920. The broadcast parameter message, unlike the broadcast data, is transmitted over a control channel. A controller 930 determines whether there is any broadcast parameter message transmitted by the base station. A message handler 950 analyzes the received broadcast parameter message and outputs the analysis result to the controller 930. Based on the analysis result, the controller 930 identifies a type of the broadcast service, designates a sub-buffer in which a frame of the corresponding service is stored, and maps the sub-buffer mask arrangement so that frames for other broadcast services are not received.

Thereafter, if frames of broadcast data received from the base station are applied to the selector 920 via the antenna ANT and the RF unit 910, the controller 930 calculates a sub-buffer index to which the received frames belong, using Equation (1), or Equation (1) and Equation (2), and delivers the calculated sub-buffer index to the selector 920. The selector 920 passes (selects) only the frames for the broadcast service selected by the user, using the sub-buffer index and the mapped sub-buffer mask, and discards the other frames.

The demodulator 940 demodulates the broadcast frames passed through the selector 920, and outputs the demodulated data to a channel decoder 960. The channel decoder 960 performs channel decoding such as convolutional decoding on the input signal, and outputs the channel-decoded signal to an outer decoder 970. The outer decoder 970 performs deinterleaving and RS decoding on the channel-decoded signal, and outputs the outer-decoded signal to a CRC checker 980. The CRC checker 980 performs CRC check on the outer-decoded signal to determine whether there is any error in the frame data, and outputs the broadcast data. The sub-buffers shown in FIG. 7 can be included in the outer decoder 970, or implemented with a separate external memory.

In the second exemplary embodiment of the present invention, the controller 930 receives the broadcast service parameter message shown in Table 8 from the message handler 950. The controller 930 determines a frame to receive in the foregoing method, and determines whether to receive the broadcast service frame according to the result. Based on the determination, the controller 930 enables the selector 920 to determine whether it will receive the current frame. If the current frame corresponds to a desired broadcast service, the controller 930 allows the selector 920 to provide its output to the demodulator 940. However, if the current frame does not correspond to the desired broadcast service, the controller 930 allows the selector 920 to drop the frame received from the RF unit 910.

As can be understood from the foregoing description, the reception apparatus employing the CDMA2000 1× Rev. D standard can receive and decode only the necessary frames, thereby preventing unnecessary power consumption. In addition, the new message according to an exemplary implementation of the present invention is fully compatible with the old message, and can contribute to a reduction in transmission time of the broadcast parameter message.

While certain exemplary aspects of the present invention have been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. A method for providing a plurality of broadcast services in which a time domain multiplex (TDM) super period has a plurality of TDM intervals, each TDM interval having streams of a plurality of time slots, each time slot being allocated to one of the plurality of broadcast services and having a plurality of TDM masks indicating whether the plurality of broadcast services are provided, the number of the TDM masks being equal to the number of the TDM intervals, the broadcast services being stored in a plurality of buffers after being interleaved and having TDM super period masks indicating validity of a plurality of bits indicating whether the same broadcast is provided, the number of the TDM super period masks being equal to the number of the plurality of TDM intervals, each of the plurality of buffers including a plurality of data areas and a parity area, and each of the plurality of buffers having data for the same broadcast service, the method comprising the steps of:

if at least one of a plurality of buffers comprises data for another broadcast service, generating a mask indicating a position of the data in a corresponding buffer for the other broadcast service; and generating information comprising an indication of a presence of the generated mask.

2. The method of claim 1, wherein a value of the mask indicating a position of the data for the other broadcast service is set exclusively for the data areas except for the parity area.

3. The method of claim 1, wherein a position in a sub-buffer for a received frame is calculated by $$inner\_index = \lfloor (i\ \%64)/4 \rfloor$$

where a value of i is 0 at a time after 20*FSCH_OUTER_CODE_OFFSETs[i] ms in a position where a CDMA2000 system time is 0.

4. A method for providing a broadcast parameter message in a mobile communication system providing [a] broadcast services, in which a time domain multiplex (TDM) super period has a plurality of TDM intervals, each TDM interval having streams of a plurality of time slots, each time slot being allocated to one of the plurality of broadcast services and having a plurality of TDM masks indicating whether the plurality of broadcast services are provided, the number of the TDM masks being equal to the number of the TDM intervals, the broadcast services being stored in a plurality of buffers after being interleaved and having TDM super period masks indicating validity of a plurality of bits indicating whether the same broadcast is provided, the number of the TDM super period masks being equal to the number of the plurality of TDM intervals, each of the plurality of buffers including a plurality of data areas and a parity area, and each of the plurality of buffers having data for the same broadcast service, the method comprising the steps of:

if the provided broadcast service is time domain multiplex (TDM)-multiplexed in one sub-buffer, generating a broadcast parameter message by setting a field comprising an indication of the TDM multiplexing, setting a field indicating a position of the broadcast service in a sub-buffer, setting a field comprising an indication of whether the sub-buffer comprises one service and a field comprising an indication of validity of the field, and setting a field exclusively indicating actual broadcast service data stored in the sub-buffer;

modulating the broadcast parameter message; and
providing the modulated broadcast parameter message to a terminal that receives the broadcast service.

5. The method of claim 4, wherein a position in the sub-buffer for a received frame is calculated by $$inner\_index = \lfloor (i\ \%64)/4 \rfloor$$

where a value of i is 0 at a time after 20*FSCH_OUTER_CODE_OFFSETs[i] ms in a position where a CDMA2000 system time is 0.

6. An apparatus for providing a broadcast parameter message in a mobile communication system providing broadcast services, in which a time domain multiplex (TDM) super period has a plurality of TDM intervals, each TDM interval having streams of a plurality of time slots, each time slot being allocated to one of the plurality of broadcast services and having a plurality of TDM masks indicating whether the plurality of broadcast services are provided, the number of the TDM masks being equal to the number of the TDM intervals, the broadcast services being stored in a plurality of buffers after being interleaved and having TDM super period masks indicating validity of a plurality of bits indicating whether the same broadcast is provided, the number of the TDM super period masks being equal to the number of the plurality of TDM intervals, each of the plurality of buffers including a plurality of data areas and a parity area, and each of the plurality of buffers having data for the same broadcast service, the apparatus comprising:

a message generator for, if the provided broadcast service is time domain multiplex (TDM)-multiplexed, generating a broadcast parameter message by setting a field comprising an indication of the TDM multiplexing, setting a field indicating a position of the broadcast service in at least one sub-buffer, setting a field indicating whether the at least one sub-buffer comprises one service and a field comprising an indication of validity of the field, and setting a field exclusively indicating actual broadcast service data stored in the at least one sub-buffer; and a transmitter for modulating the broadcast parameter message and providing the modulated broadcast parameter message to a terminal that receives the broadcast service.

7. A method for receiving a broadcast service provided in a mobile communication system, in which a time domain multiplex (TDM) super period has a plurality of TDM intervals, each TDM interval having streams of a plurality of time slots, each time slot being allocated to one of the plurality of broadcast services and having a plurality of TDM masks indicating whether the plurality of broadcast services are provided, the number of the TDM masks being equal to the number of the TDM intervals, the broadcast services being stored in a plurality of buffers after being interleaved and having TDM super period masks indicating validity of a plurality of bits indicating whether the same broadcast is provided, the number of the TDM super period masks being equal to the number of the plurality of TDM intervals, each of the plurality of buffers including a plurality of data areas and a parity area, and each of the plurality of buffers having data for the same broadcast service, the method comprising the steps of:

determining a position of a desired broadcast service by receiving a field comprising an indication of whether the provided broadcast service is time domain multiplex (TDM)-multiplexed in a sub-buffer, a field indicating a position of the broadcast service in the sub-buffer, a field indicating whether the sub-buffer comprises one service and a field indicating validity of the field, and a field exclusively indicating actual broadcast service data stored in the sub-buffer; and receiving a broadcast service in the determined position.

8. The method of claim 7, wherein a position in the sub-buffer for a received frame is calculated by $$inner\_index = \lfloor (i\ \%64)/4 \rfloor$$

where a value of i is 0 at a time after 20*FSCH_OUTER_CODE_OFFSETs[i] ms in a position where a CDMA2000 system time is 0.

9. An apparatus for receiving a broadcast service provided in a mobile communication system, in which a time domain multiplex (TDM) super period has a plurality of TDM intervals, each TDM interval having streams of a plurality of time slots, each time slot being allocated to one of the plurality of broadcast services and having a plurality of TDM masks indicating whether the plurality of broadcast services are provided, the number of the TDM masks being equal to the number of the TDM intervals, the broadcast services being stored in a plurality of buffers after being interleaved and having TDM super period masks indicating validity of a plurality of bits indicating whether the same broadcast is provided, the number of the TDM super period masks being equal to the number of the plurality of TDM intervals, each of the plurality of buffers including a plurality of data areas and a parity area, and each of the plurality of buffers having data for the same broadcast service, the apparatus comprising:

a radio frequency (RF) unit for receiving a broadcast service and a parameter indicating a position of a desired broadcast service;

a demodulator for demodulating the broadcast service and the parameter; and a controller for selecting a received broadcast service using the parameter comprising a field indicating whether the provided broadcast service is time domain multiplex (TDM)-multiplexed in a sub-buffer, a field indicating a position of the broadcast service in the sub-buffer, a field indicating whether the sub-buffer comprises one service and a field indicating validity of the field, and a field exclusively indicating actual broadcast service data stored in the sub-buffer.

* * * * *